United States Patent
Nakamura (10) Patent No.: US 9,172,302 B2
(45) Date of Patent: Oct. 27, 2015

(54) SWITCHING POWER SUPPLY DEVICE OF THE RIPPLE CONTROL METHOD

(71) Applicant: Sanken Electric Co., Ltd., Niiza-shi, Saitama (JP)

(72) Inventor: Masaru Nakamura, Niiza (JP)

(73) Assignee: Sanken Electric Co., Ltd., Niiza-Shi (JP)

( * ) Notice: Subject to any disclaimer, the term of this patent is extended or adjusted under 35 U.S.C. 154(b) by 46 days.

(21) Appl. No.: 14/093,074

(22) Filed: Nov. 29, 2013

(65) Prior Publication Data

US 2014/0152277 A1 Jun. 5, 2014

(30) Foreign Application Priority Data

Dec. 5, 2012 (JP) ................. 2012-265949

(51) Int. Cl.
*H02M 3/156* (2006.01)
*H02M 1/00* (2007.01)

(52) U.S. Cl.
CPC ...... *H02M 3/156* (2013.01); *H02M 2001/0022* (2013.01)

(58) Field of Classification Search
CPC .......... H02M 1/32; H02M 2001/0009; H02M 2001/0022; H02M 2001/0025; H02M 2001/0032
See application file for complete search history.

(56) References Cited

U.S. PATENT DOCUMENTS

| | | | |
|---|---|---|---|
| 6,593,725 B1 * | 7/2003 | Gallagher et al. | 323/284 |
| 7,019,503 B1 * | 3/2006 | Ortiz et al. | 323/282 |
| 8,334,682 B2 * | 12/2012 | Chiu et al. | 323/282 |
| 8,350,548 B2 * | 1/2013 | Tang et al. | 323/282 |
| 2005/0110474 A1 * | 5/2005 | Ortiz et al. | 323/282 |
| 2006/0226822 A1 * | 10/2006 | Xu et al. | 323/283 |
| 2006/0232226 A1 * | 10/2006 | Ortiz | 315/291 |
| 2007/0040537 A1 * | 2/2007 | Low et al. | 323/282 |
| 2007/0075695 A1 * | 4/2007 | Gan et al. | 323/282 |
| 2007/0078568 A1 * | 4/2007 | Donaldson et al. | 700/298 |
| 2008/0061750 A1 * | 3/2008 | Stoichita | 323/271 |
| 2008/0088284 A1 * | 4/2008 | Weng | 323/271 |
| 2008/0088292 A1 * | 4/2008 | Stoichita et al. | 323/285 |
| 2008/0116862 A1 * | 5/2008 | Yang et al. | 323/269 |
| 2010/0052627 A1 * | 3/2010 | Otsuka et al. | 323/225 |
| 2010/0102788 A1 * | 4/2010 | Kuroyabu et al. | 323/282 |
| 2010/0123446 A1 * | 5/2010 | Cheng et al. | 323/288 |
| 2010/0244800 A1 * | 9/2010 | Nakamura et al. | 323/284 |
| 2011/0018516 A1 * | 1/2011 | Notman et al. | 323/284 |

(Continued)

FOREIGN PATENT DOCUMENTS

JP 2011-199973 A 10/2011

*Primary Examiner* — Timothy J Dole
*Assistant Examiner* — Yusef Ahmed
(74) *Attorney, Agent, or Firm* — Marvin A. Motsenbocker; Mots Law, PLLC (57) ABSTRACT

The present invention includes: an ON-timer configured to control a period of time in which a main switching element is on; a voltage detecting circuit configured to detect an output voltage of a filter circuit; a triangular wave generator; a feed-forward circuit configured to generate a feed-forward output whose value decreases as a value of a DC voltage from a DC power supply increases; and a comparator configured to compare a second reference voltage generated by adding together a first reference voltage, a triangular wave signal from the triangular wave generator, and the feed-forward output from the feed-forward circuit, with the output voltage of the voltage detecting circuit, and based on a result of the comparison, output an ON-trigger signal for turning on the main switch element to the ON-timer.

4 Claims, 11 Drawing Sheets

(56) References Cited

U.S. PATENT DOCUMENTS

| | | | |
|---|---|---|---|
| 2011/0148374 A1* | 6/2011 | Gizara | 323/282 |
| 2011/0304309 A1* | 12/2011 | Nakamura | 323/288 |
| 2012/0025919 A1* | 2/2012 | Huynh | 331/34 |
| 2013/0002221 A1* | 1/2013 | Wang et al. | 323/283 |
| 2013/0033248 A1* | 2/2013 | Granger | 323/288 |
| 2013/0176004 A1* | 7/2013 | Lai et al. | 323/234 |
| 2013/0207632 A1* | 8/2013 | Thandi et al. | 323/288 |

* cited by examiner

SWITCHING POWER SUPPLY DEVICE OF THE RIPPLE CONTROL METHOD

TECHNICAL FIELD

The present invention relates to a switching power supply device capable of greatly improving line regulation characteristics.

BACKGROUND ART

A DC/DC converter supplies a power-supply voltage to a digital-signal processing LSI such as an image-processing engine or a CPU. The DC/DC converter is required to have high load responsiveness for a dynamically fluctuating digital load to minimize a fluctuation range of an output voltage. To meet this requirement concerning a digital load, a ripple control method has been proposed and used widely. In the ripple control method, the load responsiveness is improved by not having an error amplifier which is a main factor of a delay element.

In this ripple control, a valley voltage of an output voltage ripple is compared with a reference voltage, and when the valley voltage of the output voltage ripple falls below the reference voltage, a high-side MOSFET is turned on for a certain period of time to enable fast-response operation.

Figure 1:
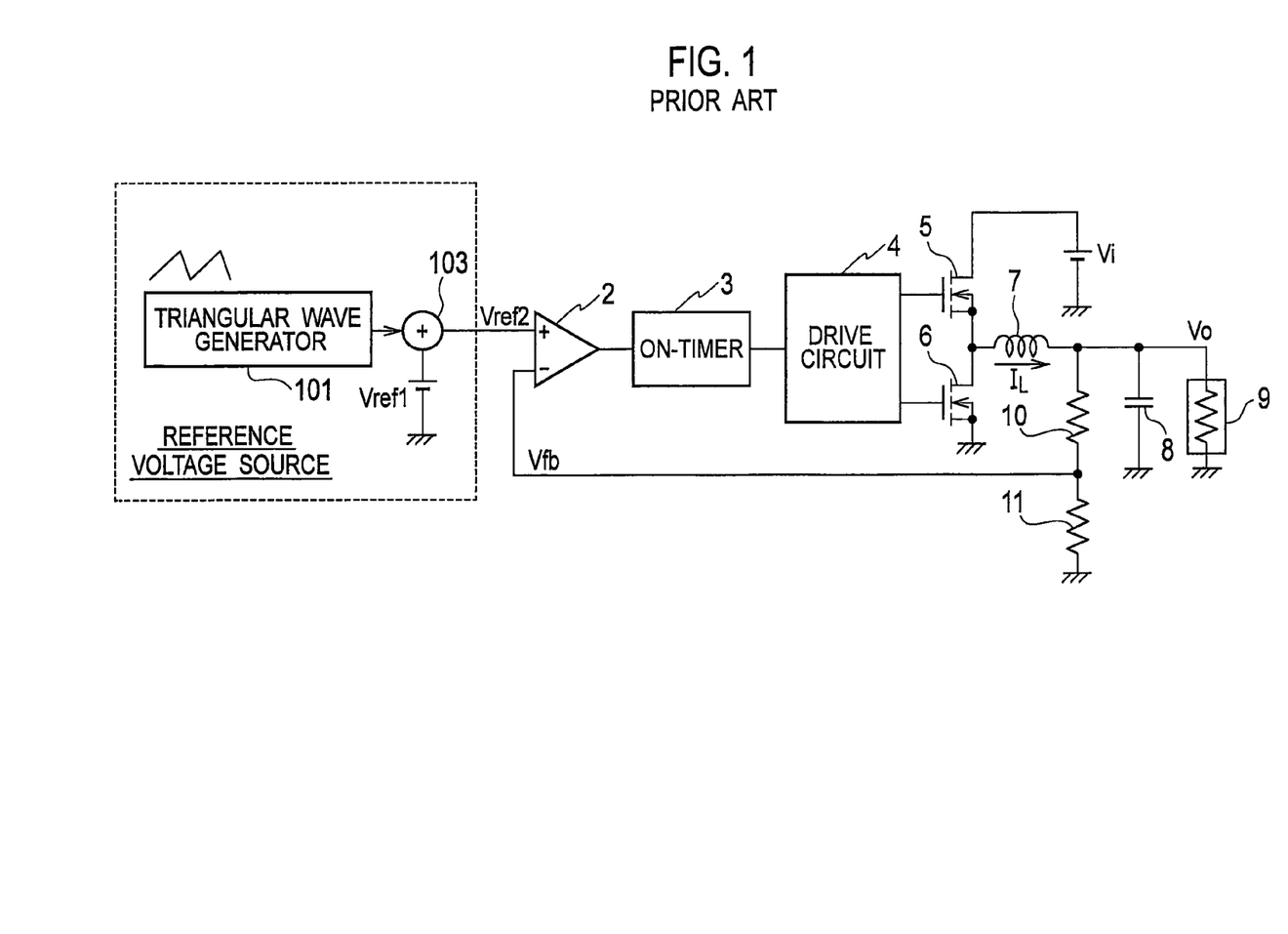
FIG. 1 is a diagram showing the circuit configuration of a switching power supply device of a prior art.
Figure 2A:
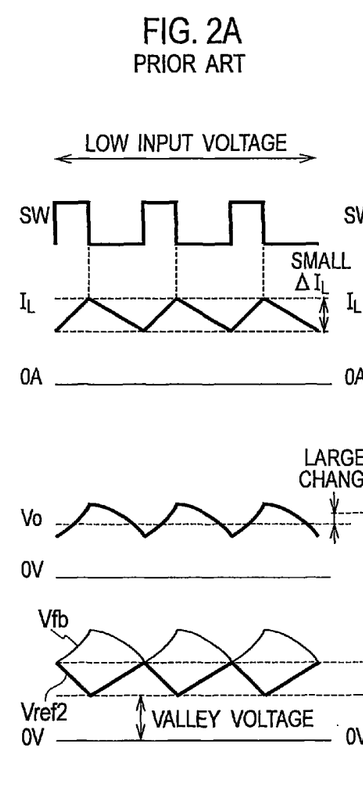
FIGS. 2A and 2B are timing charts showing waveforms of parts of the switching power supply device of the prior art when an input voltage is low and high, respectively.
Figure 2B:
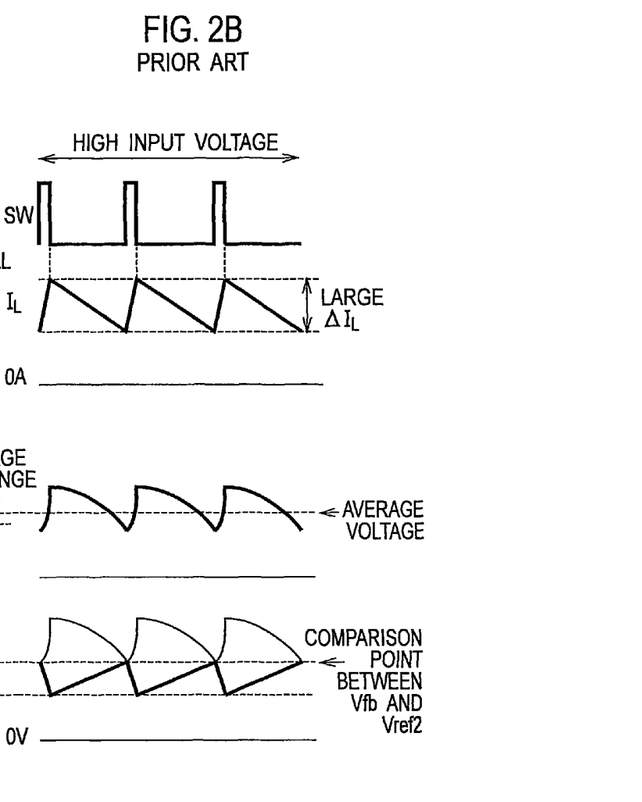

Next, operation of the ripple control including what is described in Japanese Patent Application Publication No. 2011-199973 is described with reference to a circuit diagram of a prior art shown in FIG. 1 and a timing chart shown in FIG. 2.

A triangular wave generator 101 is configured to generate a triangular wave signal which increases a second reference voltage Vref2 while a high-side MOSFET 5 is off and decreases the second reference voltage Vref2 while the high-side MOSFET 5 is on. An adder 103 is configured to generate the second reference voltage Vref2 by adding the triangular wave signal from the triangular wave generator 101 to a first reference voltage Vref1 and output the second reference voltage Vref2 to a non-inverting input terminal of a feedback comparator 2.

A feedback voltage Vfb obtained by dividing an output voltage Vo by feedback-voltage dividing resistances 10 and 11 is inputted to an inverting input terminal of the feedback comparator 2. When this feedback voltage Vfb falls below a ceiling voltage of the second reference voltage Vref2, the feedback comparator 2 outputs an ON-trigger signal to an ON-timer 3.

The ON-timer 3 is configured to receive the ON-trigger signal as input, and output a high-side MOS ON-length signal to a drive circuit 4, the signal being proportional to the output voltage and inversely proportional to the input voltage. The drive circuit 4 is configured to receive the high-side MOS ON-length signal as input, and turn on the high-side MOSFET 5.

Once an ON-duration set by the on-timer 3 ends, the high-side MOSFET 5 is turned off, and a low-side MOSFET 6 is turned on. Thereafter, when the output voltage Vo decreases to cause the feedback voltage Vfb to fall below the ceiling voltage of the second reference voltage Vref2, the low-side MOSFET 6 is turned off, and the high-side MOSFET 5 is turned on again.

By repeating such operation, an inductor current is controlled, thereby supplying energy to an output capacitor 8 and an output load 9.

However, the ripple control method described in Japanese Patent Application Publication No. 2011-199973 has the following drawback. Specifically, in the ripple control method, feedback control is performed by a comparison between the valley voltage of the output voltage ripple and the reference voltage. Thus, when the output voltage ripple changes according to a change in the input voltage, an average value of the output voltage also fluctuates. As a result, the line regulation characteristics are degraded.

Figure 3:
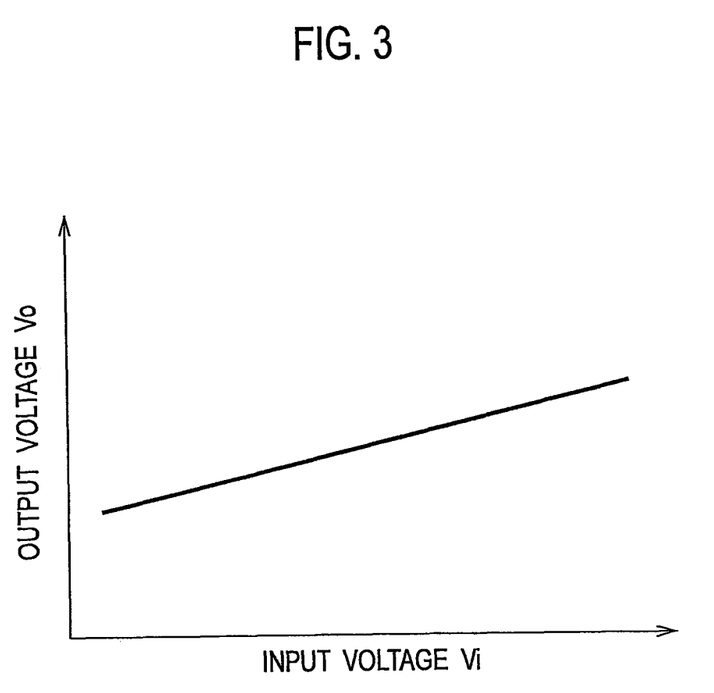
FIG. 3 is a diagram showing the characteristics of an output voltage of the switching power supply device of the prior art with respect to an input voltage.

The ripple control method is described in detail with reference to the timing chart shown in FIGS. 2A and 2B and to line regulation characteristics shown in FIG. 3. As shown in FIGS. 2A and 2B, a variation range $\Delta IL$ of an inductor current tends to be higher when the input voltage is high than when the input voltage is low. This variation range $\Delta IL$ is represented by Formula (1):

$$\Delta IL = Vo \cdot Tsw \cdot (1 - Vo/Vi)/L \qquad (1),$$

where Tsw denotes a switch cycle.

An output voltage ripple Vorip is generated when this variation range $\Delta IL$ flows to the output capacitor 8 and the output load 9. Assuming that the output load is sufficiently larger than the impedance of the output capacitor, the output voltage ripple Vorip is represented by Formula (2):

$$\Delta Vorip = Vo \cdot Tsw \cdot (1 - Vo/Vi) \cdot (1/(2\pi \cdot Fsw \cdot Co))/L \qquad (2).$$

Further, the output voltage Vo is a voltage obtained by superimposing a half of the output voltage ripple Vorip on a DC component Vo(DC) of the output voltage, and is represented by Formula (3):

$$Vo = Vo(DC) + Vorip/2 = Vo(DC) + Vo \cdot Tsw \cdot (1 - Vo/Vi) \cdot (1/(2\pi \cdot Fsw \cdot Co))/2L \qquad (3).$$

As can be seen in Formula (3), the higher an input voltage Vi is, the larger an average value of the output voltage ripple in the second term becomes and accordingly the higher the output voltage Vo becomes. Thus, as shown in FIG. 3, the line regulator characteristics are degraded.

SUMMARY OF INVENTION

The present invention has an objective of providing a switching power supply device capable of greatly improving the line regulation characteristics.

The present invention provides a switching power supply device including: a main switching element connected to a DC power supply; an ON-timer configured to control a period of time in which the main switching element is on; a voltage detecting circuit configured to detect an output voltage of a filter circuit connected to the main switching element; a triangular wave generator configured to generate a triangular wave signal; a feed-forward circuit configured to generate a feed-forward output whose value decreases as a value of a DC voltage from the DC power supply increases; and a comparator configured to compare a second reference voltage generated by adding together a first reference voltage, the triangular wave signal from the triangular wave generator, and the feed-forward output from the feed-forward circuit, with the output voltage of the voltage detecting circuit, and based on a result of the comparison, output an ON-trigger signal for turning the main switch element on to the ON-timer.

DESCRIPTION OF EMBODIMENTS

Switching power supply devices according to embodiments of the present invention are described below. The present invention is characterized in additionally having a feed-forward circuit which performs control so that a ceiling voltage and a valley voltage of a second reference voltage Vref2 may decrease as an input voltage from a DC power supply Vi increases, to thereby greatly improve line regulation characteristics.

Embodiment 1

Figure 4:
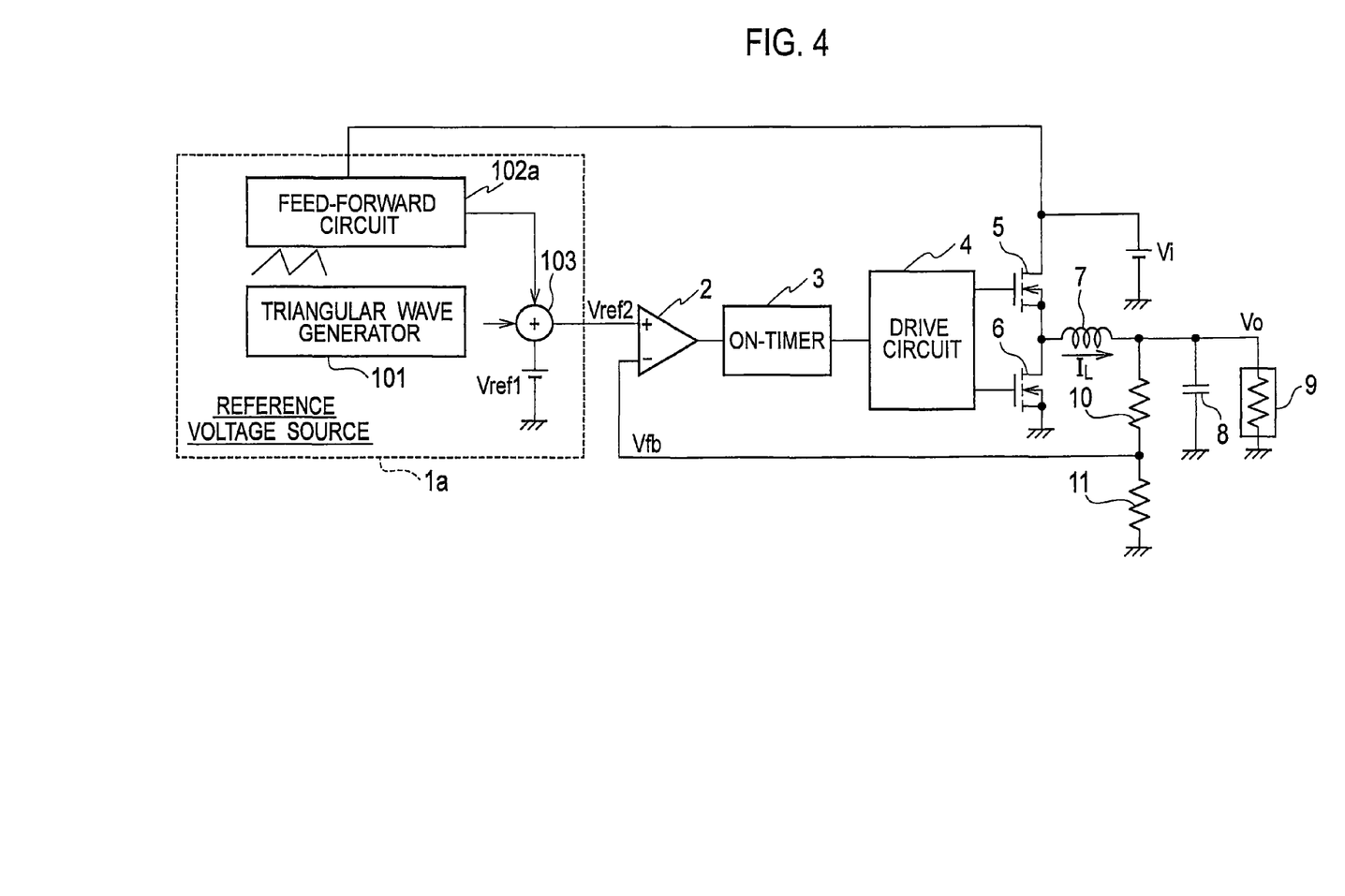
FIG. 4 is a diagram showing the circuit configuration of a switching power supply device of Embodiment 1.

FIG. 4 is a diagram showing the circuit configuration of a switching power supply device of Embodiment 1. The switching power supply device of Embodiment 1 has a DC power supply Vi, a reference voltage source 1a, a feedback comparator 2, an ON-timer 3, a drive circuit 4, a high-side MOSFET 5, a low-side MOSFET 6, an inductor 7, an output capacitor 8, an output load 9, and feedback resistances 10 and 11.

Note that the MOSFET 5 corresponds to a main switching element, and the feedback resistances 10 and 11 correspond to a voltage detection circuit.

The reference voltage source 1a has a first reference voltage source Vref1, a triangular wave generator 101, a feed-forward circuit 102a, and an adder 103.

Figure 5:
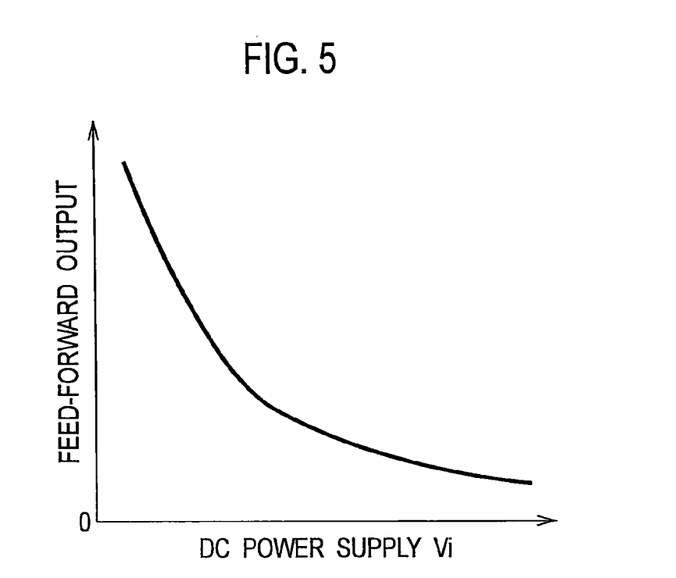
FIG. 5 is a diagram showing an example of the input-output characteristics of a feed-forward circuit in the switching power supply device of Embodiment 1.

FIG. 5 is a diagram showing an example of the input-output characteristics of the feed-forward circuit 102a in the switching power supply device of Embodiment 1. As shown in FIG. 2, the feed-forward circuit 102a has hyperbolic characteristics in which its feed-forward output decreases as the DC voltage from the DC power supply Vi increases.

Figure 6:
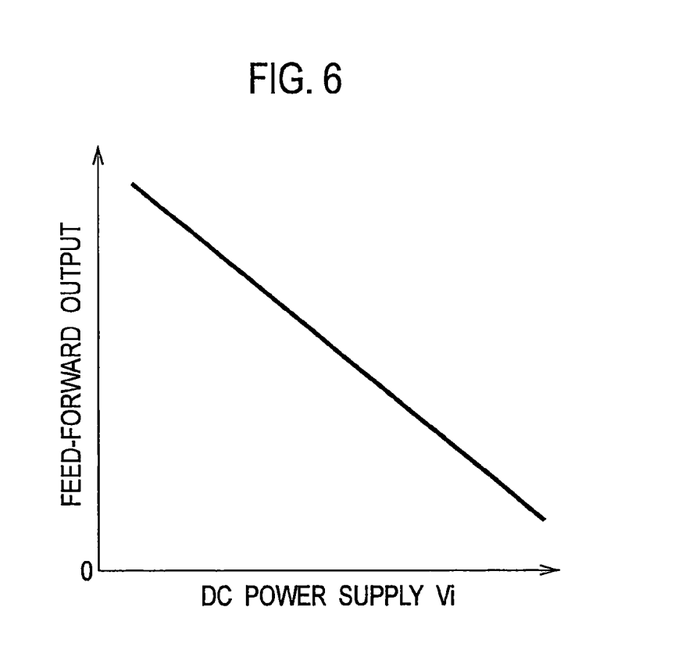
FIG. 6 is a diagram showing another example of the input-output characteristics of the feed-forward circuit in the switching power supply device of Embodiment 1.

Alternatively, as shown in FIG. 6, the feed-forward circuit 102a may have linear characteristics in which its feed-forward output decreases as the DC voltage from the DC power supply Vi increases.

The feed-forward circuit 102a can be, for example, configured with a divider, a subtractor, or the like.

The triangular wave generator 101 is configured to generate a triangular wave signal which increases while the high-side MOSFET 5 is off and decreases while the high-side MOSFET 5 is on. The adder 103 is configured to obtain a second reference voltage Vref2 by adding together a first reference voltage Vref1 of the reference voltage source Vref1, the triangular wave signal from the triangular wave generator 101, and a feed-forward output from the feed-forward circuit 102a, and output the second reference voltage Vref2 to a non-inverting input terminal of the feedback comparator 2.

Figure 7A:
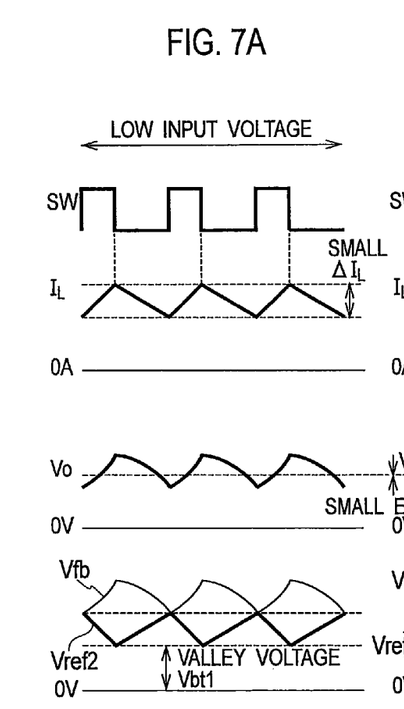
FIGS. 7A and 7B are timing charts showing waveforms of parts of the switching power supply device of Embodiment 1 when an input voltage is low and high, respectively.
Figure 7B:
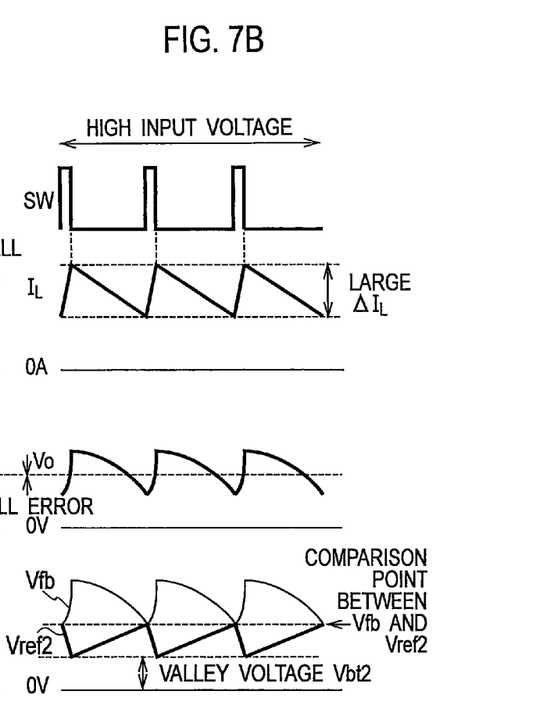

In other words, as shown in FIG. 7B, the feed-forward circuit 102a allows a ceiling voltage and a valley voltage Vbt2 of the second reference voltage Vref2 observed when an input voltage from the DC power supply Vi is high to be lower than those observed when the input voltage is low, which is shown in FIG. 7A.

In this case, as shown in FIG. 7B, the higher the DC voltage from the DC power supply Vi is, the gentler an increase slope of the triangular wave signal becomes and the steeper a decrease slope thereof becomes. Thus, the increase level and the decrease level of the triangular wave signal equal, allowing a continuous triangular wave signal to be obtained.

Further, a feedback voltage Vfb obtained by dividing an output voltage Vo by the feedback-voltage dividing resistances 10 and 11 is inputted to the inverting input terminal of the feedback comparator 2. The feedback comparator 2 outputs an ON-trigger signal to the ON-timer 3 when this feedback voltage Vfb falls below the ceiling voltage of the second reference voltage Vref2.

The ON-timer 3 receives the ON-trigger signal as input, and outputs a high-side MOS ON-length signal to the drive circuit 4, the signal being proportional to the output voltage and inversely proportional to the input voltage. The drive circuit 4 receives the high-side MOS ON-length signal as input, and turns the high-side MOSFET 5 on.

Once an ON-duration set by the ON-timer 3 ends, the high-side MOSFET 5 is turned off, and the low-side MOSFET 6 is turned on. Thereafter, when the output voltage Vo decreases to cause the feedback voltage Vfb to fall below the ceiling voltage of the second reference voltage Vref2, the low-side MOSFET 6 is turned off, and the high-side MOSFET 5 is turned on again.

By repeating such operation, inductor current is controlled, thereby supplying energy to the output capacitor 8 and the output load 9.

In the switching power supply device of Embodiment 1 configured as above, the feed-forward circuit 102a performs control so that the ceiling voltage and the valley voltage Vbt2 of the second reference voltage Vref2 may decrease as the input voltage from the DC power supply Vi increases. Thus, as shown in FIG. 7B, a comparison point between the ceiling voltage of the triangular wave signal of the second reference voltage Vref2 and the valley voltage Vbt2 of the feedback voltage Vfb is lower than that shown in FIG. 7A.

Figure 8:
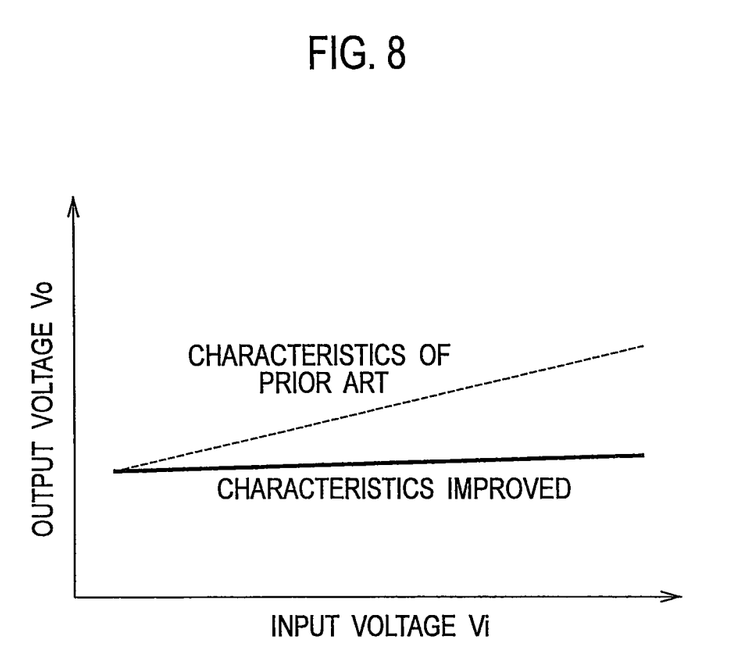
FIG. 8 is a diagram showing the characteristics of an output voltage with respect to an input voltage of the prior art and of Embodiment 1.

Consequently, there is a small error between the output voltage Vo when the input voltage is high and the output voltage Vo when the input voltage is low. Thus, the switching power supply device having favorable line regulation characteristics as shown in FIG. 8 can be provided.

Embodiment 2

Figure 9:
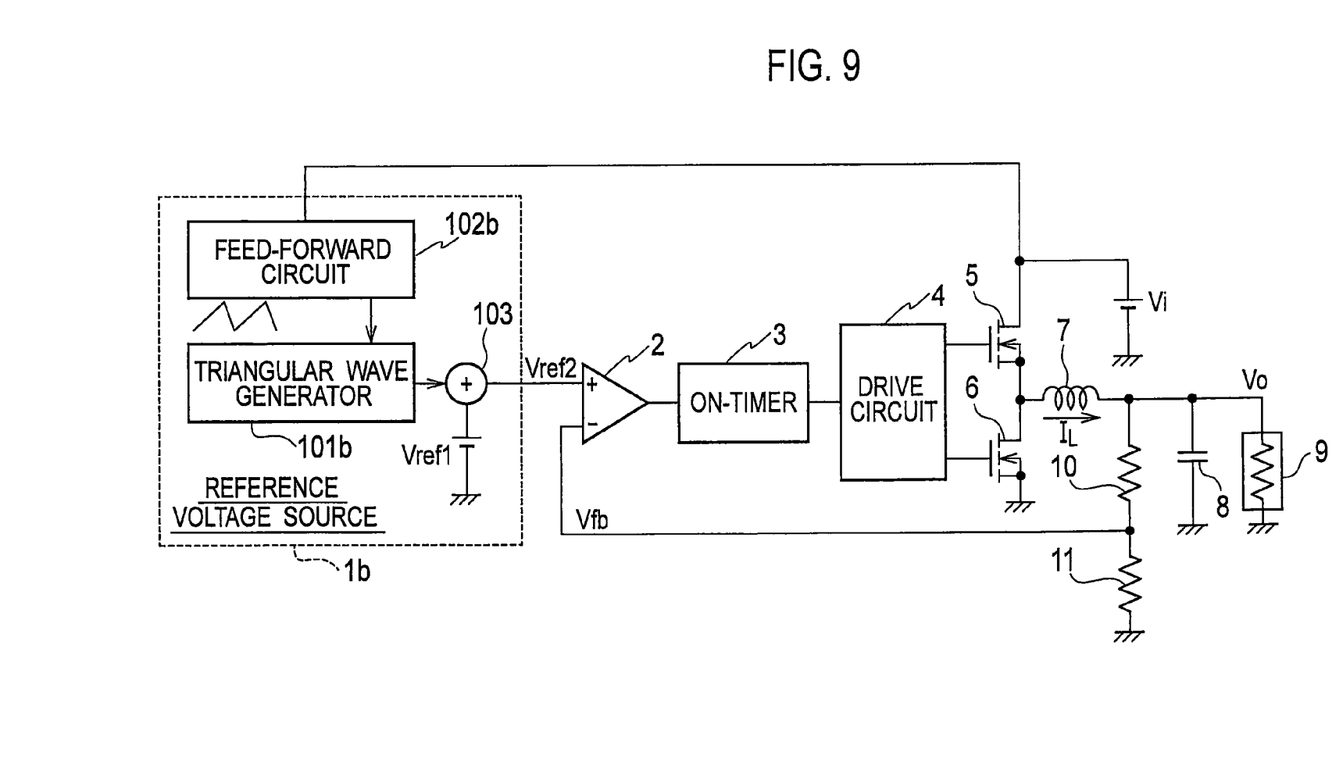
FIG. 9 is a diagram showing the circuit configuration of a switching power supply device of Embodiment 2.
Figure 10:
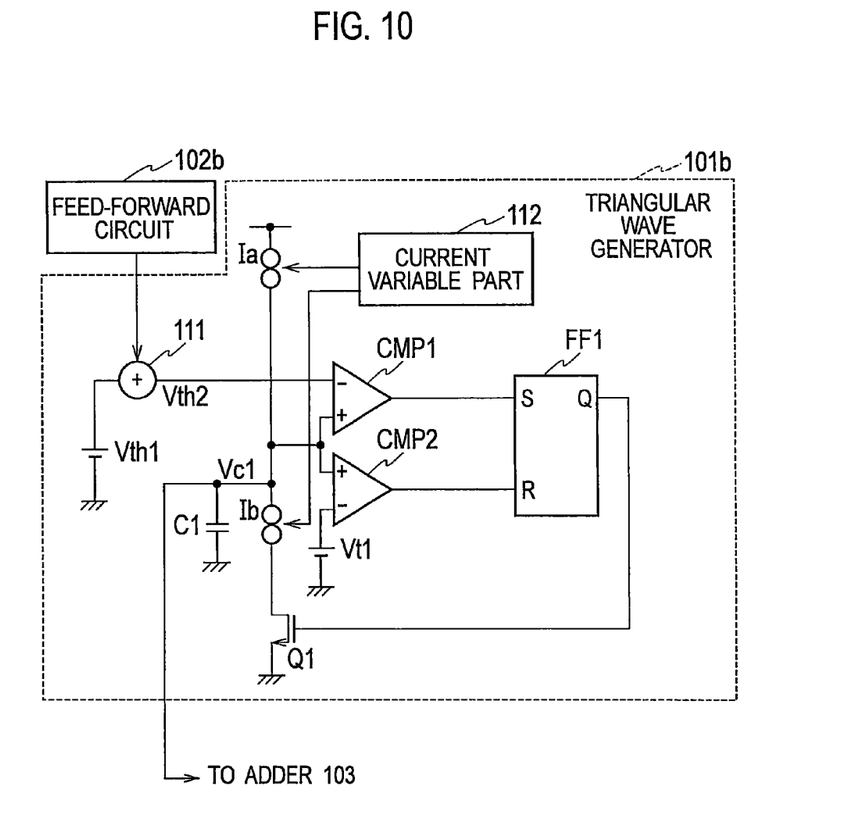
FIG. 10 is a block diagram showing the detailed configuration of a triangular wave generator in the switching power supply device of Embodiment 2.

FIG. 9 is a diagram showing the circuit configuration of a switching power supply device of Embodiment 2. FIG. 10 is a block diagram showing the specific configuration of a triangular wave generator in the switching power supply device of Embodiment 2. The switching power supply device of Embodiment 2 has a triangular wave generator 101b in place of the triangular wave generator 101 of the switching power supply device of Embodiment 1 shown in FIG. 4, and a feed-forward circuit 102b in place of the feed-forward circuit 102a of the switching power supply device of Embodiment 1 shown in FIG. 4. Other than this, the switching power supply device of Embodiment 2 has the same configuration as that of Embodiment 1; thus, the same elements are denoted by the same reference numerals and not described again here.

The switching power supply device of Embodiment 2 is characterized in that the feed-forward circuit 102b performs control so that the amplitude of a triangular wave signal from the triangular wave generator 101b may decrease as the input voltage from the DC power supply Vi increases.

The feed-forward circuit 102b has the same function as the feed-forward circuit 102a shown in FIG. 4, and is configured to output a feed-forward output to an adder 111 in the triangular wave generator 101b.

The triangular wave generator 101b shown in FIG. 10 has a reference voltage source Vth1, the adder 111, a current variable part 112, constant current sources Ia and Ib, comparators CMP1 and CMP2, a flip-flop circuit FF1, a switching element Q1, and a capacitor C1.

The adder 111 adds a reference voltage of the reference voltage source Vth1 to the feed-forward output from the feed-forward circuit 102b, and outputs the result to an inverting input terminal of the comparator CMP1.

The constant current source Ia, the constant current source Ib, and the switching element Q1 configured with a p-type MOSFET are connected in parallel. One end of the capacitor C1, a non-inverting input terminal of the comparator CMP1, and an inverting input terminal of the comparator CMP2 are connected to a connection point between the constant current source Ia and the constant current source Ib. The other end of the capacitor C1 is grounded.

A reference voltage source Vt1 has its positive electrode connected to a non-inverting input terminal of the comparator CMP1, and its negative electrode grounded. An output terminal of the comparator CMP1 is connected to a set terminal S of the flip-flop circuit FF1, and an output terminal of the comparator CMP2 is connected to a reset terminal R of the flip-flop circuit FF1. An output terminal Q of the flip-flop circuit FF1 is connected to a gate of the switching element Q1. A source of the switching element Q1 is grounded. One end of the capacitor C1 is connected to the adder 103.

The current variable part 112 varies a current of the constant current source Ia and a current of the constant current source Ib.

Next, operation of the triangular wave generator 101b of the switching power supply device of Embodiment 2 configured as above is described with reference to timing charts shown in FIGS. 11A and 11B.

Figure 11A:
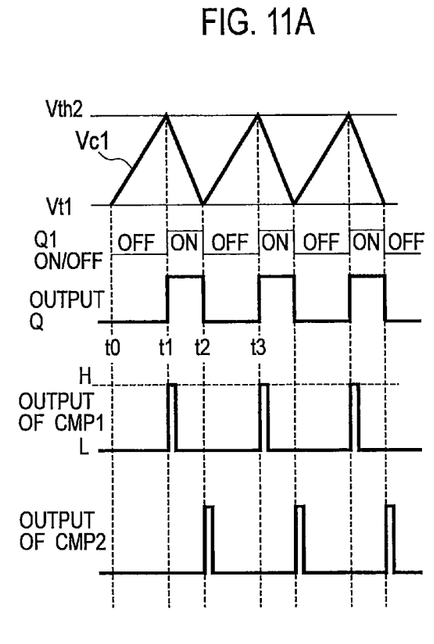
FIGS. 11A and 11B are timing charts illustrating operation of the triangular wave generator shown in FIG. 10.
Figure 11B:
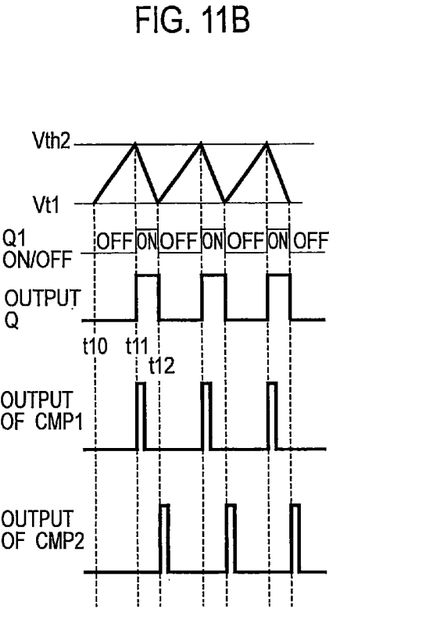

FIGS. 11A and 11B show a voltage Vc1 of the capacitor C1 and an output Q of the flip-flop circuit FF1 observed when the input voltage from the DC power supply Vi is low and high, respectively.

First, with reference to FIG. 11A, a description is given of operation performed when the input voltage from the DC power supply Vi is low. The adder 111 adds the DC voltage from the reference voltage source Vth1 to the feed-forward output from the feed-forward circuit 102b and outputs an added output Vth2 to the inverting input terminal of the comparator CMP1.

The lower the input voltage from the DC power supply Vi is, the larger the value of the feed-forward output from the feed-forward circuit 102b is. Thus, the added output Vth2 of a large value can be obtained.

A constant current from the constant current source Ia flows through the capacitor C1 to increase a voltage Vc1 of the capacitor C1 linearly from time point t0 to time point t1. Once the voltage Vc1 of the capacitor C1 reaches the added output Vth2 at time point t1, the comparator CMP1 outputs an H level to the set terminal S of the flip-flop circuit FF1.

Then, the flip-flop circuit FF1 outputs an H level to the switching element Q1, turning the switching element Q1 on and thereby discharging the capacitor C1 from time point t1 to time point t2.

Then, once the voltage of the capacitor C1 reaches the reference voltage Vt1, the comparator CMP2 outputs an H level to the reset terminal R of the flip-flop circuit FF1. Consequently, the flip-flop circuit FF1 outputs an L level from an output terminal thereof to a gate of the switching element Q1.

This turns the switching element Q1 off, and the constant current source Ia charges the capacitor C1 from time point t2 to time point t3. By repeating such processing, the voltage Vc1 of the capacitor C1, i.e., a triangular wave signal, is outputted to the adder 103.

When, on the other hand, the input voltage from the DC power supply Vi is high, the feed-forward circuit 102b outputs a feed-forward output of a smaller value, and therefore, as shown in FIG. 11B, the added output Vth2 obtained is small.

As shown in FIG. 11B, a difference between the reference voltage Vt1 and the added output Vth2 is reduced. Further, a length between time point t10 and time point t11 and a length between time point t11 and time point t12 are shorter than a length between time point t0 and time point t1 and a length between time point t1 and time point t2 shown in FIG. 11A. For this reason, the frequency shown in FIG. 11B is higher than that shown in FIG. 11A, allowing reduction in the ripple component.

Figures 12A, 12B:
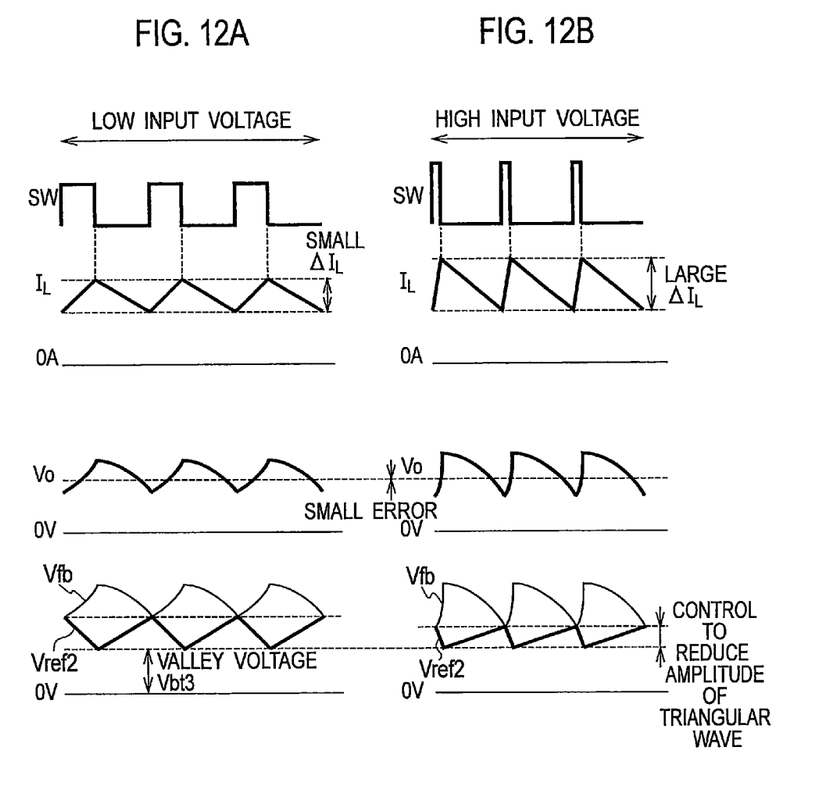
FIGS. 12A and 12B are timing charts showing waveforms of parts of the switching power supply device of Embodiment 2 when an input voltage is low and high, respectively.

Moreover, since the added output Vth2 shown in FIG. 11B is smaller than that shown in FIG. 11A, the amplitude of the triangular wave signal of the second reference voltage Vref2 shown in FIG. 12B is controlled to be smaller than that shown in FIG. 12A.

Consequently, as shown in FIGS. 12A and 12B, there is a small error between the output voltage Vo obtained when the input voltage is high and the output voltage Vo obtained when the input voltage is low. In other words, like in Embodiment 1, the switching power supply device having favorable line regulation characteristics can be provided.

The triangular wave generator 101b may increase the second reference voltage Vref2 when the high-side MOSFET 5 is on and decrease it when the high-side MOSFET 5 is off.

By performing control to increase a current of the constant current source Ib, the current variable part 112 can make the decrease slope of the second reference voltage Vref2 steeper as the value of the input voltage from the DC power supply Vin increases.

Similarly, by performing control to decrease a current of the constant current source Ia, the current variable part 112 can make the increase slope of the second reference voltage Vref2 gentler.

According to the present invention, the feed-forward circuit generates a feed-forward output whose value decreases as the value of the DC voltage of the DC power supply increases. Then, the second reference voltage generated by the adder adding together the first reference voltage, the triangular wave signal, and the feed-forward output also decreases as the value of the DC voltage increases. Thus, the line regulation characteristics can be improved greatly.

What is claimed is:

1. A switching power supply device of a ripple control method comprising:
   a main switching element connected to a DC power supply;
   an ON-timer configured to control a period of time in which the main switching element is on;
   a voltage detecting circuit configured to detect an output voltage of a filter circuit connected to the main switching element;
   a triangular wave generator configured to generate a triangular wave signal;
   a feed-forward circuit configured to generate a feed-forward output whose value decreases as a value of a DC voltage from the DC power supply increases; and
   a comparator configured to compare a second reference voltage generated by adding together a first reference voltage, the triangular wave signal from the triangular wave generator, and the feed-forward output from the feed-forward circuit, with the output voltage from the voltage detecting circuit, and based on a result of the comparison, output an ON-trigger signal for turning on the main switch element to the ON-timer, wherein
   while the main switching element is on, the triangular wave generator performs control to decrease the second reference voltage with a decrease slope that becomes steeper as the value of the DC voltage from the DC power supply increases, and
   while the main switching element is off, the triangular wave generator performs control to increase the second reference voltage with an increase slope that become gentler as the value of the DC voltage from the DC power supply increases, and
   wherein
   the feed-forward circuit performs control such that at least one of a ceiling voltage and a valley voltage of the second reference voltage decreases as the value of the DC voltage from the DC power supply increases.

2. The switching power supply device of the ripple control method according to claim 1, wherein
   the feed-forward circuit performs control such that an amplitude of the triangular wave signal included in the second reference voltage decreases as the value of the DC voltage from the DC power supply increases.

3. A switching power supply device of a ripple control method comprising:
   a main switching element connected to a DC power supply;
   an ON-timer configured to control a period of time in which the main switching element is on;
   a voltage detecting circuit configured to detect an output voltage of a filter circuit connected to the main switching element;
   a triangular wave generator configured to generate a triangular wave signal;
   a feed-forward circuit configured to generate a feed-forward output whose value decreases as a value of a DC voltage from the DC power supply increases; and
   a comparator configured to compare a second reference voltage generated by adding together a first reference voltage, the triangular wave signal from the triangular wave generator, and the feed-forward output from the feed-forward circuit, with the output voltage from the voltage detecting circuit, and based on a result of the comparison, output an ON-trigger signal for turning on the main switch element to the ON-timer, wherein
   while the main switching element is on, the triangular wave generator performs control to decrease the second reference voltage with a decrease slope that becomes steeper as the value of the DC voltage from the DC power supply increases, and
   while the main switching element is off, the triangular wave generator performs control to increase the second reference voltage with an increase slope that become gentler as the value of the DC voltage from the DC power supply increases and wherein
   the feed-forward circuit performs control such that an amplitude of the triangular wave signal included in the second reference voltage decreases as the value of the DC voltage from the DC power supply increases.

4. The switching power supply device of the ripple control method according to claim 3, wherein
   the feed-forward circuit performs control such that at least one of a ceiling voltage and a valley voltage of the second reference voltage decreases as the value of the DC voltage from the DC power supply increases.

* * * * *